July 25, 1967     I. J. STOLLER     3,332,831
METHOD AND CONSTRUCTION OF JOINING TOGETHER
REINFORCED SHEETS OF PLASTIC
Filed Feb. 8, 1965

INVENTOR
IRVING J. STOLLER
BY
Mullin & Alter
ATTORNEYS

> United States Patent Office 3,332,831
Patented July 25, 1967

3,332,831
METHOD AND CONSTRUCTION OF JOINING TOGETHER REINFORCED SHEETS OF PLASTIC
Irving J. Stoller, Chicago, Ill., assignor to Sto-Cote Products, Inc., Chicago, Ill., a corporation of Illinois
Filed Feb. 8, 1965, Ser. No. 431,071
10 Claims. (Cl. 161—145)

This invention relates generally to a method and construction suitable for joining together two pieces of reinforced plastic and more particularly to a method and construction for joining together two sheets of reinforced polyethylene.

In the past, there has been considerable use of filament reinforced plastic sheets such as polyethylene. Such material comprises filaments of reinforcing material embedded or sandwiched between films of polyethylene. Usually, the reinforcing material is of a thicker guage than the polyethylene sheets in which it is molded, in order that the physical properties of the polyethylene with regard to tensile strength, etc., be greatly improved thereby.

One of the most common uses of this type of material is to provide waterproof tarpaulin covers and liners. However, in order to make tarpaulin covers and liners that have wider dimensions than commercially available sheets of polyethylene, it is necessary to join two pieces of reinforced ployethylene together. In the past, it was virtually impossible to obtain a leak-proof seal because upon the application of the heat and pressure necessary to bond the plastic between the filaments, the plastic coating the filaments was often melted away thereby exposing or breaking the filaments.

With my new method and construction for joining together the reinforced polyethylene sheets, I have solved the problem of joining together two sheets of reinforced polyethylene to provide a resultant leak-proof seal, by constructing the joint with a pair of outer sealing films disposed to sandwich the polyethylene sheets where they overlap, and with an inner sealing film interposed between the polyethylene sheets at the same point, the thickness of the added films is sufficient to prevent exposure of the reinforcing filaments despite application of sufficient heat and pressure to insure positive bonding together of all the sheets and films.

It is therefore a primary object of this invention to provide an improved method and construction for joining together two sheets of reinforced plastic.

It is still further an object of this invention to provide a new method and construction for joining together two sheets of reinforced polyethylene plastic in a leak-proof fashion.

It is still even further an object of this invention to join together two pieces of reinforced plastic material without exposing or breaking the reinforcing filaments when the reinforced plastic material is joined together.

It is still even further an object of this invention to make possible the provision of reinforced plastic leak-proof material in all sizes due to a new and improved method and construction for joining together the plastic material commercially available.

With the foregoing and other objects in view which will appear as the description proceeds, the invention includes certain novel methods, features of construction, arrangements and a combination of elements hereinafter fully described, illustrated in the accompanying drawing, and particularly pointed out in the appended claims, it being understood that various changes in the form, proportion, size and minor details of the novel method and construction may be made without departing from the spirit or sacrificing any of the advantages of the invention.

For the purpose of facilitating an understanding of my invention, I have illustrated in the accompanying drawing a preferred embodiment thereof, from an inspection of which, when considered in connection with the following description, my invention, its mode of construction, assembly and operation, and many of its advantages should be readily understood and appreciated.

Referring to the drawing in which the same characters of reference are employed to indicate corresponding or similar parts throughout the several figures of the drawing.

Figure 1:
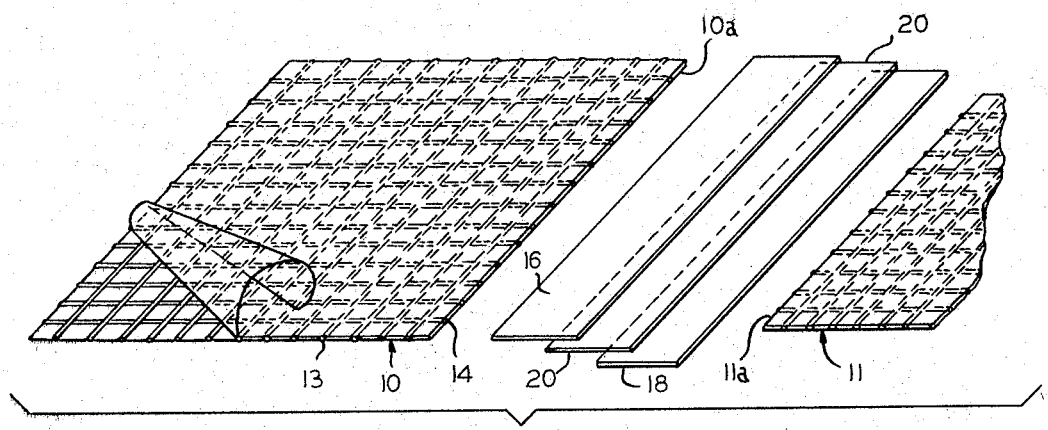
FIG. 1 is a pictorial view of two sheets of reinforced polyethylene before they are joined with the sealing films in my new method and construction for joining the plastic sheets together.

Referring to the drawings more particularly wherein like characters of reference designate corresponding parts throughout, the plastic sheets of my invention are preferably illustrated as a pair of reinforced polyethylene sheets 10 and 11, which could be constructed in accordance with U.S. Patent No. 3,084,089 entitled "Fibrous Glass Reinforcement," issued April 2, 1963. In this construction, as seen in FIG. 1, the plastic sheets have a double layer with the reinforcing material molded therein between the double layer sheets. The reinforcing material (which may be fibrous) are preferably arranged in a mesh pattern with the elements 13, 14 thereof disposed perpendicular to, and intersecting each other (see FIG. 4). These elements may be cylindrical with a diameter which is larger than the thickness of the polyethylene sheets. Consequently, the sheets are formed with protuberances 25 on both sides thereof to conform to the curvature of the reinforcing material and to form a covering for said reinforcing material.

Figure 2:
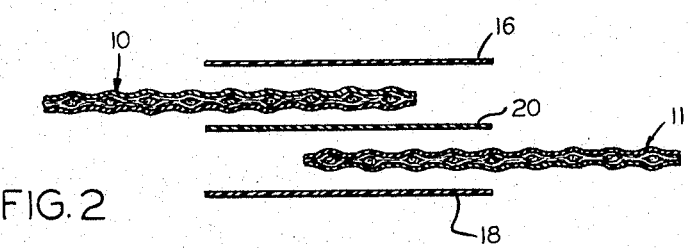
FIG. 2 is a side elevational view of the reinforced plastic sheets with the sealing films disposed in proper relationship with the plastic sheets before they are bonded together therewith to produce my improved joint.
Figure 3:
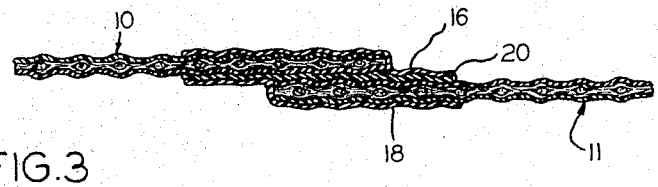
FIG. 3 is a cross sectional view illustrating the reinforced plastic sheets joined together with my new and improved joint construction and method.
Figure 4:
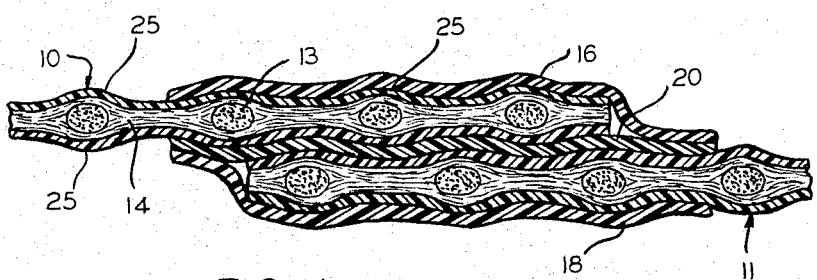
FIG. 4 is an enlarged sectional view of FIG. 3.

As seen in FIGS. 2, 3 and 4, three sealing films, including a pair of outer sealing films 16, 18 and an inner sealing film 20 are disposed to extend along the length of the joint to affect a waterproof seal construction by forming protective coatings around the protuberances 25 when the plastic sheets 10, 11 and the sealing films 16, 18 and 20 are bonded together. Of course any suitable plastic such as polyethylene which has flexible characteristics along with being capable of bonding, can be used for the sealing films.

To join the plastic sheets 10, 11 together in accordance with my new and improved method and construction, the plastic sheets are placed with their edges 10a and 11a (FIG. 1) in overlapping position, and the sealing films are disposed as illustrated in FIGS. 2, 3 and 4 with the outer sealing films 16 and 18 sandwiching the reinforced plastic sheets 10 and 11. The inner sealing film 20 is interposed between the plastic sheets, 10 and 11, all of said films extending along the length of said joint consrtuction. Thereafter, both heat and pressure are applied to the plastic sheets and sealing films along the length of the joint construction to bond them together in a leak-proof fashion.

The thickness of the sealing films must be sufficient to form a strong enough protective coating around the reinforcing materials 13 and 14 so that when heat and pressure is applied sufficient to bond the sealing members and the plastic sheets, the reinforcing members are not exposed or broken at points where the sealing films cover the reinforcing members. The sealing members must be of such dimension and characteristics that they form protective films covering each protuberance of the polyethylene sheets. Thus even though some of the polyethylene which coats the filaments may be melted away during the sealing process, the polyethylene films replace this melted material at these points. Thus the filaments remain embedded or coated with polyethylene, albeit it is the polyethylene of the films rather than that of the original sheets.

It will thus be realized that I have provided a new and improved method and construction for joining together two places of reinforced polyethylene sheets in a manner that accomplishes the stated objects of this invention in a remarkably unexpected fashion. Still further, while I have preferably illustrated my invention in connection with round reinforcing material having a particular mesh pattern, it should be realized that the reinforcing material can be of other shapes than round and other mesh patterns are contemplated.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. An improved joint construction for a pair of sheets of plastic having one end of each sheet overlapping, said plastic sheets having reinforcing material bonded integrally therein, said reinforcing material having a greater thickness than said sheets and said sheets being formed with protuberances on both sides of said sheets conforming to the curvature of said reinforcing material and covering said reinforcing material, comprising: a pair of outer sealing films disposed to sandwich said sheets where they overlap, said outer sealing films being bonded to said plastic sheets and forming a protective covering over each protuberance of said plastic sheets, and an inner sealing film interposed between said sheets of flexible plastic where they overlap, said inner and outer sealing films being bonded to said plastic sheets where the surfaces thereof come in contact with said plastic sheet to form a protective film covering for said protuberances of said plastic sheets.

2. An improved joint construction for a pair of sheets of polyethylene having one end of each sheet overlapping, said polyethylene sheets having reinforcing material bonded integrally therein, said reinforcing material having a greater thickness than said sheets and said sheets being formed with protuberances on both sides of said sheets conforming to the curvature of said reinforcing material and covering said reinforcing material, comprising: a pair of outer flexible plastic sealing films disposed to sandwich said sheets where they overlap, said outer flexible plastic sealing films being bonded to said plastic sheets and forming a protective covering over each protoberance of said plastic sheets, and an inner flexible plastic sealing film interposed between said sheets of flexible plastic where they overlap, said inner and outer sealing films being bonded to said polyethylene sheets where the surfaces thereof come in contact with said plastic sheets to form a protective film covering for said protuberances of said polyethylene sheets.

3. An improved joint construction for a pair of sheets of polyethylene having one end of each sheet overlapping, said plastic sheets having reinforcing material bonded integrally therein, said reinforcing material having a cylindrical shape with a greater thickness than said polyethylene sheets and said sheets being formed with protuberances on both sides of said sheets conforming to the curvature of said reinforcing material and covering said reinforcing material, comprising: a pair of outer sealing films disposed to sandwich said sheets where they overlap, said outer sealing films being bonded to said polyethylene sheets and forming a protective covering over each protuberance of said sheets, and an inner sealing film interposed between said polyethylene sheets where they overlap, said inner and outer sealing films being bonded to said polyethylene sheets where the surfaces thereof come in contact with said plastic sheets to form a protective film covering said protuberances of said plastic sheets.

4. An improved joint construction for a pair of sheets of plastic having one end of each sheet overlapping, said plastic sheets having reinforcing material bonded integrally therein, said reinforcing material having a greater thickness than said sheets and said sheets being formed with protuberances on both sides of said sheets conforming to the curvature of said reinforcing material and covering said reinforcing material, comprising: a pair of outer sealing films disposed to sandwich said sheets where they overlap, said outer sealing films being bonded to said plastic sheets and forming a protective covering over each protuberance of said plastic sheets, and an inner sealing film interposed between said sheets of flexible plastic where they overlap, said inner and outer sealing films being bonded to said plastic sheets where the surfaces thereof come in contact with said plastic sheets to form a protective film covering for said protuberances of said plastic sheets, said sealing films being fabricated of a flexible material that is of sufficient thickness and has physical properties that enable the plastic sheets and sealing films to be bonded without rupturing said sealing films and plastic sheets at said protuberances.

5. An improved joint construction for a pair of sheets of polyethylene having one end of each sheet overlapping, said polyethylene sheets having reinforcing material bonded integrally therein, said reinforcing material having a greater thickness than said sheets and said sheets being formed with protuberances on both sides of said sheets conforming to the curvature of said reinforcing material and covering said reinforcing material wherein the improvement comprises:

at least an inner polyethylene sealing film deposited between said polyethylene sheets where they overlap, said inner film being bonded to said polyethylene sheets, said inner film being of sufficient thickness and having physical properties that enable the polyethylene sheets and the inner polyethylene film to be bonded together without rupturing the polyethylene sheets at said protuberances.

6. An improved joint construction as defined in claim 5, wherein said reinforcing material has cylindrical shaped elements with a diameter thicker than said polyethylene sheets, and said reinforcing material has a mesh pattern where said elements are disposed perpendicular to one another.

7. A process for joining together a pair of plastic sheets with plastic sealing films wherein said plastic sheets have reinforcing material bonded integrally therein and said reinforcing material is of a greater thickness than said sheets, comprising the steps of: placing said plastic sheets with one edge of each sheet overlapping the other, placing an outside sealing film on each side of said plastic sheets along the length of said joint construction to sandwich the outside of said plastic sheets where they overlap, interposing an inner sealing film between said plastic sheets along the length of said joint construction, applying heat and pressure along the length of said joint construction to cause said sealing films and plastic sheets to bond together.

8. A process for joining together a pair of polyethylene sheets with at least one polyethylene sealing film wherein said polyethylene sheets have reinforcing material bonded integrally therein and said reinforcing material is of a greater thickness than said sheets comprising the steps of: placing said plastic sheets with one edge of each sheet overlapping the other, wherein the improvement comprises:
  depositing said polyethylene film between the overlapped ends of said polyethylene sheets;
  applying heat to said inner polyethylene film to enable the same to bond with said polyethylene sheets; and
  applying pressure to said overlapped ends to cause said polyethylene sheets and said polyethylene film to bond together and form a sealed joint.

9. A process for joining together a pair of polyethylene sheets with flexible plastic sealing films wherein said polyethylene sheets have reinforcing material that is shaped cylindrically and bonded integrally therein in a mesh pattern and said cylindrical elements have a diameter of a greater thickness than said sheets comprising the steps of: placing said polyethylene sheets with one edge of each sheet overlapping the other, placing an outside sealing film on each side of said plastic sheets along the length of said joint construction to sandwich the outside of said plastic sheets where they overlap, interposing an inner sealing film between said plastic sheets along the length of said joint construction, applying heat and pressure along the length of said joint construction to cause said sealing films and plastic sheets to bond together.

10. The joint construction of claim 5, wherein portions of said inner polyethylene film replace material of said sheets which flows away from the protuberances of said reinforcing material during the forming of said sealed joint.

References Cited
UNITED STATES PATENTS
2,060,906  11/1936  Synder _____ 156—157

ALEXANDER WYMAN, *Primary Examiner.*
W. J. VAN BALEN, *Assistant Examiner.*